United States Patent [19]

Carman

[11] 3,775,997

[45] Dec. 4, 1973

[54] GEAR TYPE COUPLING

[75] Inventor: Kenneth K. Carman, Ellicott City, Md.

[73] Assignee: Koppers Company, Inc., Pittsburgh, Pa.

[22] Filed: May 18, 1972

[21] Appl. No.: 254,396

[52] U.S. Cl. .............................. 64/9, 64/8, 64/14
[51] Int. Cl. ............................................ F16d 3/18
[58] Field of Search ....................... 64/9 R, 8, 7, 14, 64/16

[56] References Cited
UNITED STATES PATENTS

| 1,905,431 | 4/1933 | Banner | 64/9 |
| 2,543,918 | 3/1951 | Lower | 64/9 |
| 2,128,088 | 8/1938 | Hanft | 64/7 |

FOREIGN PATENTS OR APPLICATIONS

| 1,172,488 | 6/1964 | Germany | 64/9 |
| 942,428 | 11/1963 | Great Britain | 64/9 |

Primary Examiner—Charles J. Myhre
Assistant Examiner—Randall Heald
Attorney—Boyce C. Dent et al.

[57] ABSTRACT

A gear type coupling provides for misalignment between the axes of substantially co-axial interconnected shafts. An outer sleeve encloses coupling components and includes radially inwardly extending gear teeth. An outer hub member, within the sleeve, has radially outwardly extending gear teeth for meshing with the sleeve gear teeth and also includes radially inwardly extending gear teeth. An inner hub member, within the outer hub member, has radially outwardly extending gear teeth for meshing with the inner gear teeth of the outer hub. The inner and outer hubs are angularly pivotable relative to each other and relative to the sleeve to compensate for shaft misalignment. Pilot means comprising special bearing surfaces on the outer hub engage corresponding bearing surfaces on the inner hub for maintaining radial concentricity between the inner and outer hubs and to limit angular deflection to a common point along the axis of the coupling.

12 Claims, 14 Drawing Figures

GEAR TYPE COUPLING

CROSS REFERENCE TO RELATED APPLICATIONS

This invention relates generally to the coupling structure disclosed in co-pending application Ser. No. 89,764 filed on Nov. 16, 1970 now U.S. Pat. No. 3,673,814 by Kenneth K. Carman entitled *Gear Type Coupling*, and assigned to the assignee of the present invention.

BACKGROUND OF THE INVENTION

1. Field of the Invention

This invention relates generally to flexible shaft couplings and particularly to those couplings having intermeshing gear teeth.

2. Description of the Prior Art

Generally, the purpose of gear type couplings is to connect substantially co-axial but relatively misaligned shafts for transmitting torque from a driving member to a driven member. Flexible gear type couplings are useful in rolling mill applications, for example, where each roll is driven by a drive shaft which is coupled to a driven shaft by a pair of gear type couplings connected by a spindle shaft.

Conventionally, gear type couplings comprise an outer sleeve having radially inwardly extending spur gear teeth for meshing with radially outwardly extending spur gear teeth on a hub concentric within the sleeve. The hub gear teeth may be shaped, such as by crowning, to permit the hub to pivot angularly within the sleeve while the torque is transmitted through the meshing gear teeth. However, when meshing gear teeth are angularly pivoted or deflected, uneven tooth loading occurs and the torque transmitting capacity of the meshing gear teeth is reduced usually in proportion to the amount of misalignment. Occasionally, uneven loading causes some of the teeth to fail.

O. A. Banner U.S. Pat. No. 1,905,431 seeks to minimize gear tooth failure due to uneven loadings during deflection by use of a secondary or outer hub located concentrically about the inner hub thus permitting angular misalignment between the sleeve and outer hub and between outer and inner hub members. By introducing two concentric sets of hub gear teeth, the total deflection per set is less than in the case of a single set for the same amount of shaft misalignment thus reducing the loads imposed on mating gear teeth during misalignment.

A known problem in gear type couplings having inner and outer hub members is caused by rotation of the coupling components about their individual pivot points. That is, the outer hub to sleeve connection may pivot about a point which may be axially and radially displaced from the pivot point of the inner to outer hub connection. When these pivot points are displaced, unbalanced moments are created. Therefore, as the components rotate during operation, the unbalanced moments cause conflicting centrifugal forces to act on the coupling assembly thus producing an effect known in the art as whipping or cranking. When this occurs, the possibility of gear tooth failure is increased.

Shipley U.S. Pat. No. 3,070,979 teaches an elaborate compound coupling, particularly useful in marine applications, for reducing angular deflection per each set of meshing gear teeth and limiting displacement between pivot points for concentric gear sets. However, there is a need for a coupling which will reduce angular deflection per each set of gear teeth (such as by dividing the total deflection between two sets of meshing gear teeth); maintain a common axial pivot point for each gear set, and maintain concentricity between the hub members without the need for additional elaborate means; and, which is useful in various applications where ease of disassembly and reassembly might be required.

SUMMARY OF THE INVENTION

Accordingly, the present invention is a substantial improvement over heretofore known gear type couplings. Objects of this invention include reducing angular misalignment or deflection between each set of gear teeth; maintaining a common pivot point for the inner and outerhubs; maintaining concentricity thereby avoiding the whipping effect caused by unbalanced moments associated with coupling components; and providing a coupling concept which is useful for various applications. In addition, the present coupling may be disassembled and reassembled without difficulty caused by elaborate and numerous coupling components.

These and other objects and novel features are achieved in the present invention by providing a gear type coupling including an outer sleeve having radially inwardly extending spur gear teeth; and outer hub member, within the sleeve, having radially outwardly extending spur gear teeth for meshing with the sleeve gear teeth and further including radially inwardly extending spur gear teeth; and inner hub member, within the outer hub member, having radially outwardly extending spur gear teeth for meshing with the inner teeth of the outer hub; inner and outer hubs being angularly pivotable relative to each other and relative to the sleeve; and pilot means between the inner and outer hub members for maintaining radial concentricity therebetween and for restricting or limiting relative axial movement between the inner and outer hub members along the axis of the coupling.

The objects of this invention will be more completely disclosed and described in the following specification, the accompanying drawings and the appended claims.

DRAWINGS

In the drawings wherein like parts are marked alike.

DESCRIPTION OF THE PREFERRED EMBODIMENT

Figures 1, 2:
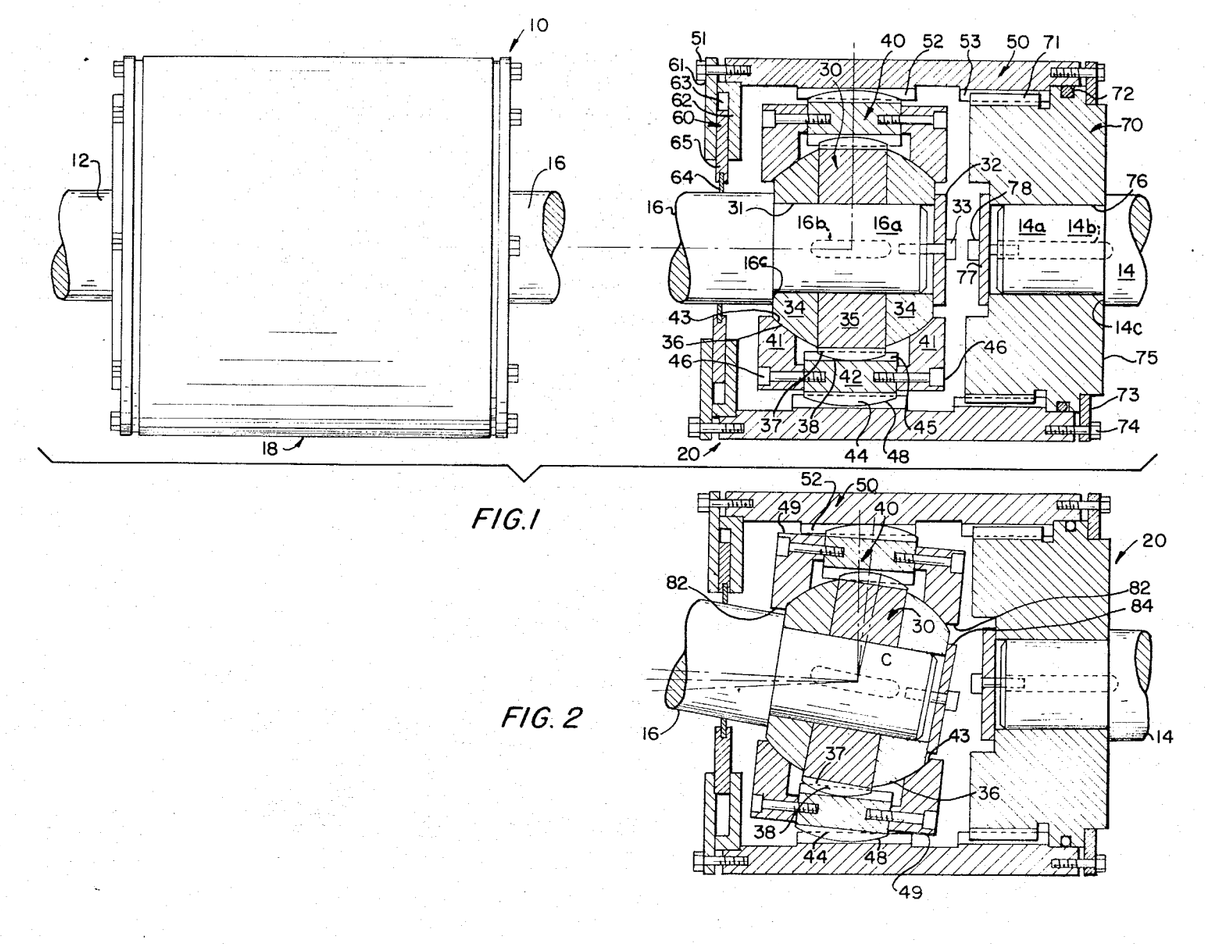
FIG. 1 is a partial cross-sectional side elevation of a pair of the novel gear type couplings connecting a drive shaft to a driven shaft through a spindle shaft.
FIG. 2 shows one of the gear type couplings of FIG. 1 with the spindle shaft and inner and outer hub members angularly misaligned with respect to the sleeve.

FIG. 1 illustrates a pair of gear type couplings, generally designated 10, connecting driving shaft 12 to driven shaft 14 by spindle shaft 16 which is similarly attached at its opposite ends to the pair of gear type couplings designated 18 and 20. This general arrangement is well-known for providing an angularly deflectable or misaligned connection between relatively misaligned shafts when such connection is used to transmit torque from a driving member to a driven member. Couplings 18 and 20 generally include an inner hub member noted generally by numeral 30, an outer hub member noted generally by numeral 40 and a sleeve member noted generally by numeral 50. Seal member 60 surrounds shaft 16 at the left end of sleeve 50 as viewed in FIG. 1. Shaft 14 is attached to coupling 20 within the opposite end of sleeve 50 in a manner which does not permit angular deflection of shaft 14 with respect to sleeve 50. Shaft 12 is attached to coupling 18 in a manner similar to that described for shaft 14.

FIG. 2 further illustrates coupling 20 with shaft 16, inner hub 30 and outer hub 40 angularly deflected with respect to sleeve 50. Seal 60 is operable to radially adapt to the angular deflection of shaft 16.

Referring again to FIG. 1, sleeve member 50 substantially defines an axial bore. A first end of sleeve 50 includes seal 60 which is secured to a first radial face of sleeve 50 by bolts 51.

Seal 60 includes a first annular ring 61 abutting a second annular ring 61 for forming a radially inwardly extending annular groove 63 therebetween. A third annular circumferentially flexible ring 64 is in annular engagement with shaft 16 and includes a rigid annular portion 65 extending radially outwardly and into sliding engagement within groove 63. Thus ring 64 seals lubricant within sleeve member 50 and around spindle shaft 16. Ring 64 may conveniently be of the type sold under the tradename "Spirolox."

Sleeve member 50 includes radially inwardly extending and axially spaced sets of gear teeth 52 and 53. Gear teeth 52 are provided for engagement with outer hub 40 as will be more fully discussed later herein. Gear teeth 53 are provided for engagement with hub 70 which includes radially outwardly extending gear teeth 71. Gear teeth 53 and 71 provide a non-rotatable connection between sleeve 50 and hub 70 respectively. A conventional rubber O-ring 72 provides an effective lubricant seal between hub 70 and sleeve 50. Hub 70 is secured to a second radial face of sleeve 50 by ring 73 and bolts 74.

Driven shaft 14 includes a reduced diameter end portion 14a having a longitudinal keyway 14b. Shaft 14 and extended portion 14a meet to form radial face 14c in abutting relationship with radial face 75 of hub 70. Extended portion 14a is adapted to fit within inner bore 76 of hub 70. Bore 76 has a mating key positioned therein to non-rotatably secure shaft 14 within hub 70. Shaft 14 is axially secured relative to hub 70 by radial plate 77 and bolt 78.

Figure 11:
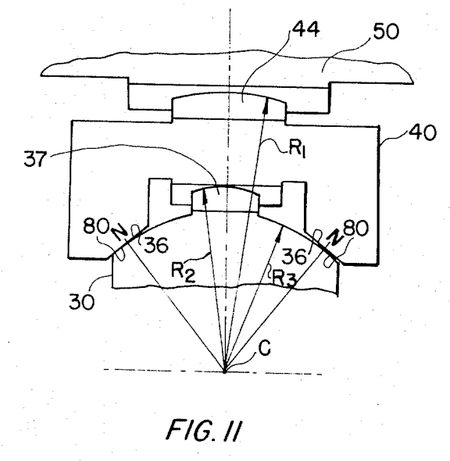
FIG. 11 is a diagrammatic illustration representing outer hub members having conical bearing surfaces and inner hub members having convex bearing surfaces.
Figure 12:
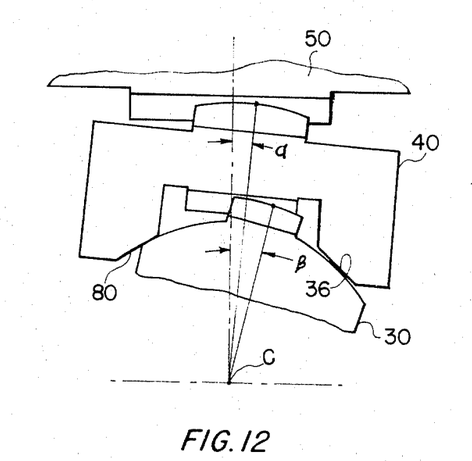
FIG. 12 is a diagrammatic illustration representing the hub members of FIG. 11 in angular misaligned positions with respect to the sleeve.

Outer hub member 40 is positioned within sleeve 50 and includes similar or corresponding radial plate-type spherical segments 41 which are axially opposed and secured to opposite sides of annular outer hub gear teeth segment 42 by bolts 46. Spherical segments 41 have inner annular spherical or concave bearing surfaces 43 adapted for co-acting mating engagement with outer annular spherical or convex bearing surfaces 36 on inner hub 30 as will be discussed later herein. If desired, as illustrated in FIGS. 11 and 12, outer hub member 40 may be constructed with conical bearing surfaces 80 rather than concave bearing surfaces 43 shown in FIGS. 1–10. The conical bearing surfaces 80 are adapted for co-acting tangential engagement with outer annular spherical or convex bearing surfaces 36 on inner hub 30. Outer hub gear teeth segment 42 is positioned between bearing segments 41 and includes radially outwardly extending gear teeth 44 and radially inwardly extending gear teeth 45. Outwardly extending gear teeth 44 are positioned to engage inwardly extending gear teeth 52 of sleeve 50 to provide a non-rotatable connection therewith and outer hub member inwardly extending gear teeth 45 are positioned to engage inner hub member outwardly extending gear teeth 37. Gear teeth 44 may be crowned 48, that is, teeth 44 may have axially arcuate circumferential faces formed as well-known in the art to pilot and to permit angular pivoting or deflection of outer hub 42 relative to sleeve 50.

Spindle shaft 16 includes reduced diameter extended portion 16a having a longitudinal keyway 16b. Shaft 16 and extended portion 16a meet to form radial face 16c. Extended portion 16a is adapted to fit within inner bore 31 of inner hub 30. Bore 31 has a mating key positioned therein to non-rotatably secure shaft 16 within hub 30. Shaft 16 is axially secured relative to hub 30 by radial plate 32 and bolt 33.

Inner hub 30 further includes similar radial plate-type spherical segments 34 which are axially opposed and secured adjacent opposite sides of inner hub annular gear teeth segment 35. Spherical segments 34 include outer annular spherical or convex bearing surfaces 36; and, annular inner segment 35, positioned between segments 34, includes radially outwardly extending gear teeth 37 positioned to engage outer hub member inwardly extending gear teeth 45 to provide a non-rotatable connection therewith. Bearing segments 34 along with inner segment 35, when axially aligned along shaft portion 16a and secured between plate 32 and radial face 16c form inner hub member 30 including bore 31. If desired, inner hub 30 may be formed as a unitary part integrating segments 34 and 35 to form an integral hub 30 which may likewise be secured to shaft portion 16a between plate 32 and radial face 16c.

In FIG. 2, the co-acting mating engagement of outer hub member bearing surfaces 43 or co-acting tangential engagement of outer hub member conical bearing surfaces 80 with inner hub member bearing surfaces 36 provide piloting to maintain concentricity between the inner and outer hub members 30 and 40 respectively and cause both to pivot about a common point, designated C along the axis of the coupling, relative to each other and relative to sleeve 50. Also, inner hub 30 and outer hub 40 are simultaneously axially movable relative to sleeve 50 but mating bearing surfaces 43 and 36 or tangential engagement surfaces 80 and 36 co-act to limit relative axial movement between inner hub 39 and outer hub 40. Gear teeth 44 are crowned at 48 in the usual manner to enable hub 40 to be piloted and to pivot angularly relative to sleeve 50. Advantageously, inner hub outwardly extending gear teeth 37 may be crowned at 38, that is, teeth 37 may have an axially arcuate configuration similar to teeth 44, to permit pivoting of inner hub 30 relative to outer hub 40 and relative to sleeve 50.

Radially outwardly extending annular shoulder portion 49 of outer hub 40 is operable to abut inwardly extending teeth 52 of sleeve 50 to limit pivoting of outer hub 40 relative to sleeve 50. Radially inward extending shoulder portion 82 of outer hub 40 is operable to abut shaft 16 and radially inward extending shoulder portion 82 of outer hub 40 is operable to abut the outer peripheral surface 84 of radial plate 32 to limit pivoting of shaft 16 and inner hub 30 relative to outer hub 40 thereby providing stop means between the sleeve 50, outer hub 40, and inner hub 30.

FIGS. 3–10 diagrammatically illustrate a partial view of sleeve 50 including radially inwardly extending gear teeth 52; outer hub 40 including radially outwardly extending gear teeth 44 engaging hub gear teeth 52 and radially inwardly extending gear teeth 45; and inner hub 30 including radially outwardly extending gear teeth 37 engaging outer hub inwardly extending gear teeth 45. In each figure, both inner hub 30 and outer hub 40 are pivotable about a center point designated C, or hinge point as it is commonly called.

Figure 3:
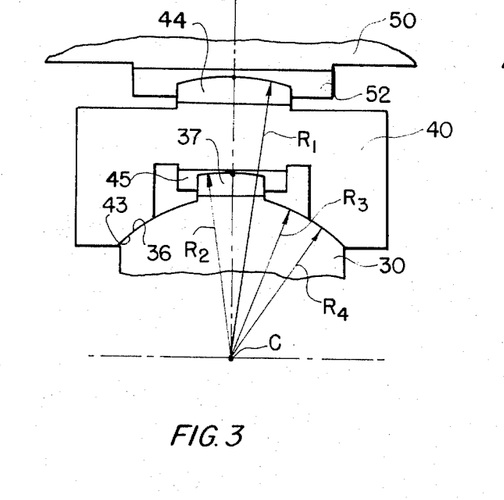
FIG. 3 is a diagrammatic illustration representing inner and outer hub members having crowned, axially aligned gear teeth.

In FIG. 3 the arrow designated R1 represents the radius of crowned gear teeth 44, struck from the hinge point C thus permitting outer hub 40 to pivot about point C relative to sleeve 50. Also, the arrow designated R2 represents the radius of crowned gear teeth 37, struck from point C thus permitting inner hub 30 to pivot about point C relative to sleeve 50 and relative to outer hub 40. Axially opposed spherical annular bearing surfaces 43 of outer hub 40 mate in co-acting engagement with axially opposed spherical annular bearing surfaces 36 of inner hub 30. The arrow designated R3 represents the radius of inner hub bearing surfaces 36 and the arrow R4 represents the coextensive radius of outer hub bearing surfaces 43. Radii R3 and R4 are both struck from point C thus creating the following advantageous conditions:

1. Inner hub 30 is pivotable about center C relative to outer hub 40 and sleeve 50;
2. Outer hub 40 is pivotable about center C relative to inner hub 30 and sleeve 50;
3. Both hubs 30 and 40 are pivotable about point C relative to each other and to sleeve 50;
4. Both hubs 30 and 40 can move simultaneously relative to sleeve 50;
5. Neither hub 30 nor 40 have relative axial movement; and
6. Outer hub 40 is maintained concentric (piloted) with inner hub 30.

Figure 4:
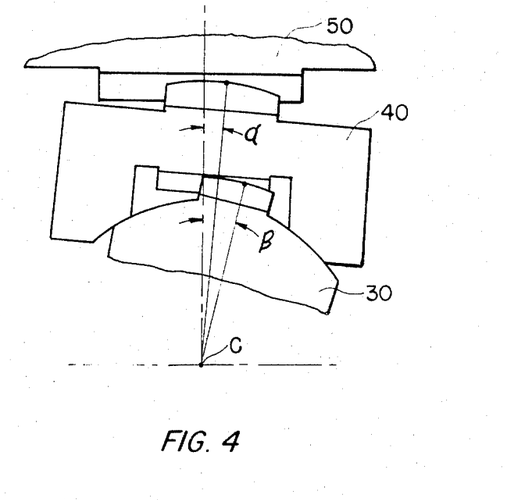
FIG. 4 is a diagrammatic illustration representing the hub members of FIG. 3 in angularly misaligned positions with respect to the sleeve.

FIG. 4 diagrammatically illustrates hubs 30 and 40 of FIG. 3 pivoted about point C relative to each other and relative to sleeve 50. Hub 40 is angularly deflected or pivoted through an angle designated alpha ($\alpha$) and hub 30 is deflected through an angle designated beta ($\beta$). However, since all angular deflection or misalignment occurs about point C, the undesirable unbalanced moments are substantially limited since hubs 30 and 40 rotate about point C.

Figure 5:
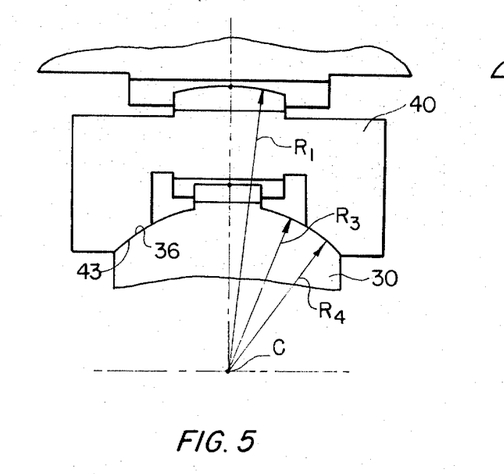
FIG. 5 is a diagrammatic illustration representing inner and outer hub members having axially aligned gear teeth with only the outer hub member gear teeth being crowned.
Figure 6:
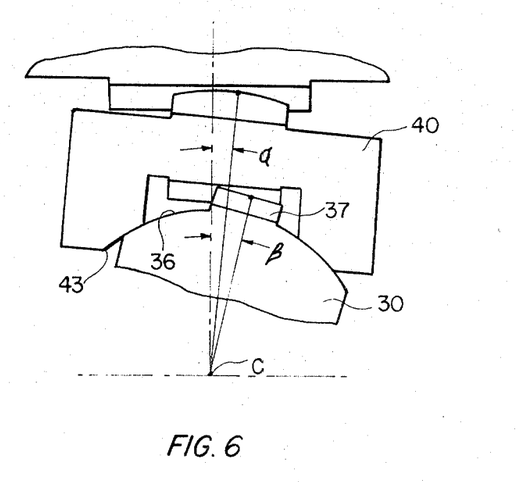
FIG. 6 is a diagrammatic illustration representing the hub members of FIG. 5 in angularly misaligned positions with respect to the sleeve.

FIGS. 5 and 6 illustrate that due to the piloting provided by annular bearing surfaces 43 and 36, crowning of gear teeth 37 is not essential to pilot inner hub 30 within outer hub 40. Thus, gear teeth 37 may be made straight since bearing surfaces 43 and 36 will permit pivoting of inner hub 30 about point C to compensate for angular misalignment of shaft 16 with respect to shaft 14.

Figures 7, 8:
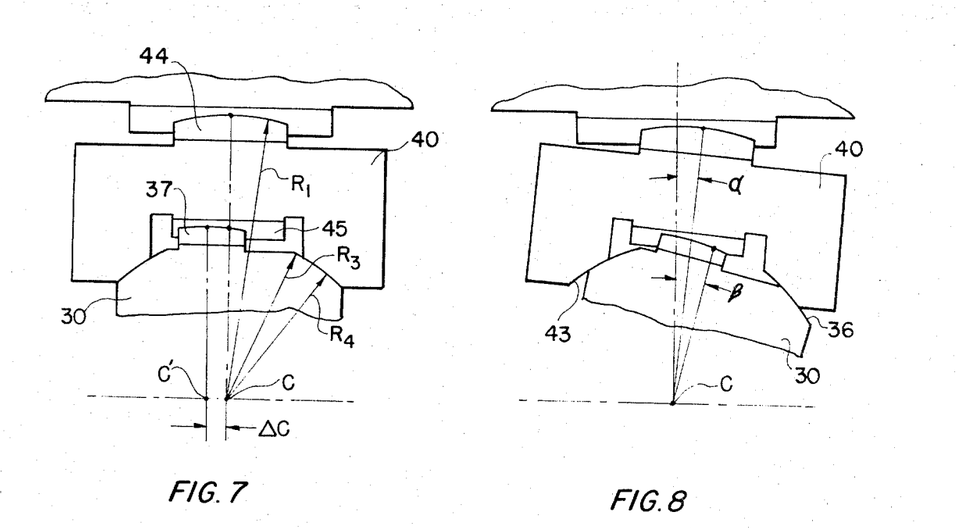
FIG. 7 is a diagrammatic illustration representing inner and outer hub members having crowned gear teeth which are not axially aligned.
FIG. 8 is a diagrammatic illustration representing the hub members of FIG. 7 in angularly misaligned positions with respect to the sleeve.

FIGS. 7 and 8 illustrate that the advantages of the present invention are not sacrificed even if it is desired to axially offset the gear tooth centers. In FIG. 7, gear teeth 44 and 45 of outer hub 40 are axially aligned with respect to point C, whereas gear teeth 37 of inner hub 30 are axially aligned with respect to point C' thus establishing an axial offset between C and C' designated delta C ($\Delta C$). However, the piloting established by annular spherical bearing surfaces 43 and 36 of outer and inner hubs 40 and 30, respectively, due to the radii R3 and R4 passing through point C, maintain the six basic advantageous conditions as set forth above.

Figures 9, 10:
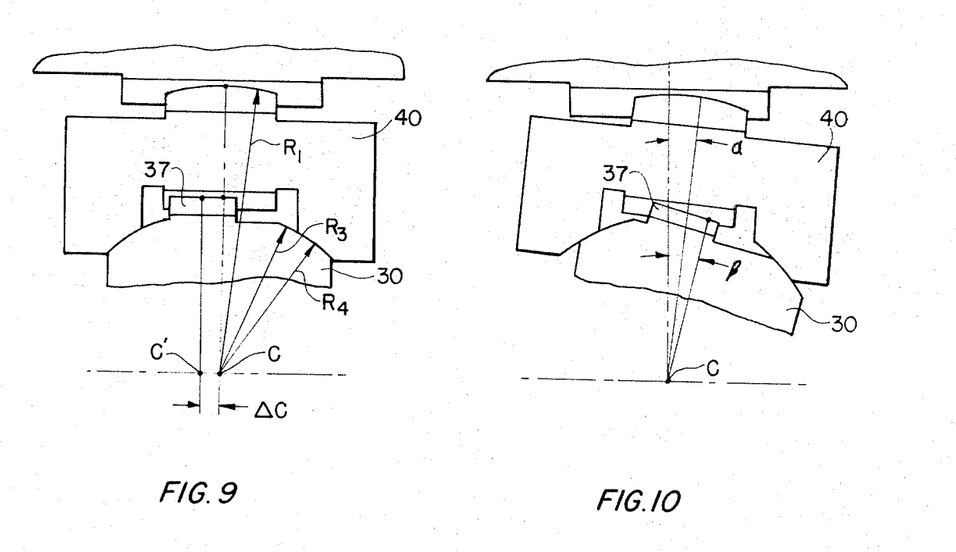
FIG. 9 is a diagrammatic illustration representing inner and outer hub members having gear teeth which are not axially aligned with only the outer hub member gear teeth being crowned.
FIG. 10 is a diagrammatic illustration representing the hub members of FIG. 9 in angularly misaligned positions with respect to the sleeve.

FIGS. 9 and 10 illustrate the advantages of the present invention even though the inner gear teeth 37 are not crowned and the gear teeth of inner hub 30 and outer hub 40 are axially offset by a distance ($\Delta C$).

FIG. 11 illustrates piloting effect between conical bearing surfaces 80 of outer hub 40 and the convex bearing surfaces 36 of inner hub 30. The arrow designated R1 represents the radius of crowned gear teeth 44, struck from the hinge point C thus permitting outer hub 40 to pivot about point C relative to sleeve 50. Also, the arrow designated R2 represents the radius of crowned gear teeth 37 struck from point C thus permitting inner hub 30 to pivot about point C relative to sleeve 50 and relative to outer hub 40. Axially opposed conical bearing surfaces 80 of outer hub 40 engage and co-act with axially opposed spherical annular bearing surfaces 36 of inner hub 30. The arrow designated R3 represents the radius of inner hub bearing surfaces 36 and line N represents a line normal to the conical bearing surfaces 80. Radius R3 and normal line N are both struck from point C thus creating the same advantageous conditions as hithertofore described in FIG. 3.

FIG. 12 diagrammatically illustrates hubs 30 and 40 of FIG. 11 pivoted about point C relative to each other and relative to sleeve 50. With convex bearing surfaces 36 in engagement with conical bearing surfaces 80, hub 40 is angularly deflected or pivoted through angle alpha ($\alpha$) and hub 30 is deflected through angle beta ($\beta$); therefore, since all angular deflection or misalignment occurs about point C, the undesirable unbalanced moments are substantially limited since hubs 30 and 40 rotate about point C.

Figure 13:
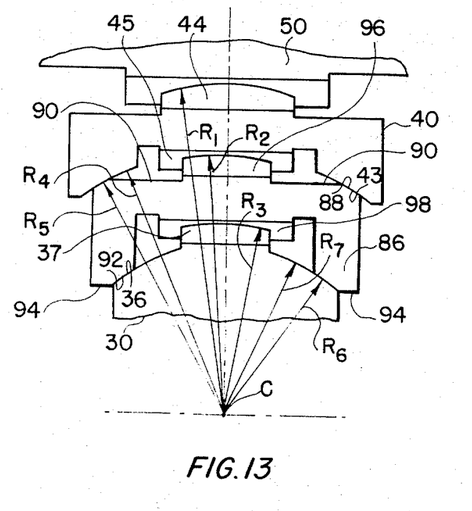
FIG. 13 is a diagrammatic illustration of a gear type coupling having an outer hub member, an intermediate hub member, and an inner hub member.
Figure 14:
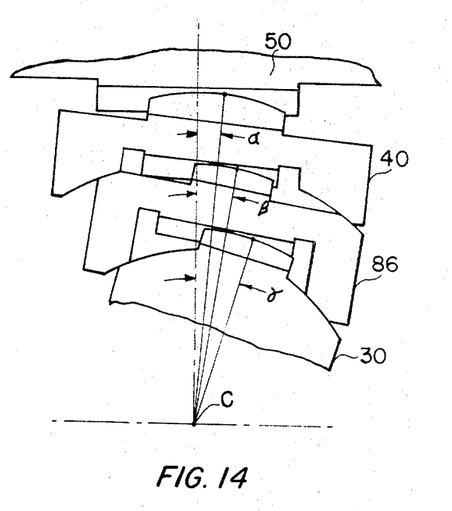
FIG. 14 is a diagrammatic illustration representing the hub members of FIG. 13 in angular misaligned positions with respect to the sleeve.

FIGS. 13 and 14 illustrates how the advantages of the present invention may be further increased by the addition of an intermediate hub 86 between outer hub member 40 and inner hub member 30. Sleeve member 50, outer hub member 40, and inner hub member 30 are constructed exactly the same as hereinbefore described and therefore will not be described in further detail. Intermediate hub 86 is positioned within outer hub 40 and may be constructed as one piece, as shown in FIG. 13, or it may be constructed in segments, not shown, similar to the construction of outer hub 40 as shown in FIG. 1. For illustration purposes intermediate hub 86 will be considered as a solid one piece member.

Intermediate hub member 86 includes outer annular spherical or convex bearing surfaces 88 located on each axially opposed radially outward extending shoulder portions 90 and are adapted for co-acting mating engagement with inner annular spherical or concave bearing surfaces 43 on outer hub 40. Inner annular spherical or concave bearing surfaces 92 located on each axially opposed radially inward extending shoulder portions 94 are adapted for co-acting mating engagement with outer annular spherical or convex bearing surfaces 36 on inner hub 30.

Intermediate hub member 86 further includes radially outwardly extending gear teeth 96 and radially inwardly extending gear teeth 98 positioned substantially between axially opposed shoulder portions 90 and 94. Outwardly extending gear teeth 96 are positioned to engage inwardly extending gear teeth 45 of outer hub 40 to provide a non-rotatable connection therewith and inwardly extending gear teeth 98 are positioned to engage outwardly extending gear teeth 37 of inner hub 30 to provide a non-rotatable connection therewith. Gear teeth 96 may be crowned as abovefore described to permit angular pivoting of intermediate hub 86 relative to outer hub 40.

The co-acting mating engagement of outer hub bearing surfaces 43 with intermediate hub convex bearing surfaces 88 and intermediate hub concave bearing surfaces 92 with inner hub bearing surfaces 36 provide piloting to maintain concentricity between outer hub member 40, intermediate hub member 86, and inner hub member 30 and cause all three to pivot about a common point C along the axis of the coupling relative to each other and relative to sleeve 50. Also all three hubs are simultaneously axially movable relative to sleeve 50 but mating bearing surfaces 43, 88, 92, and 36 co-act to limit relative axial movement between outer hub 40, intermediate hub 86, and inner hub 30.

In FIG. 13 the arrow designated R1 represents the radius of crowned teeth 44, struck from the hinge point C thus permitting outer hub 40 to pivot about point C relative to sleeve 50. The arrow designated R2 represents the radius of crowned teeth 96 struck from the hinge point C thus permitting intermediate hub 86 to pivot about point C relative to sleeve 50 and outer hub 40. The arrow designated R3 represents the radius of crowned teeth 37, struck from hinge point C thus permitting inner hub 30 to pivot about point C relative to sleeve 50, outer hub 40, and intermediate hub 86. Axially opposed spherical annular bearing surfaces 43 of outer hub 40 mate in co-acting engagement with outer axially opposed spherical bearing surfaces 88 of intermediate hub 86 and inner axially opposed spherical bearing surfaces 92 of intermediate hub 86 mate in co-acting engagement with axially opposed spherical bearing surfaces 36 of inner hub 30. The arrow designated R4 represents the radius of outer hub bearing surface 43 and the arrow R5 represents the co-extensive radius of intermediate hub outer bearing surfaces 88. The arrow R6 represents the radius of intermediate hub inner bearing surfaces 92 and R7 represents the co-extensive radius of inner hub bearing surfaces 36. Radii R4, R5, R6, and R7 are all struck from point C thus creating the following advantageous conditions:

1. Inner hub 30 is pivotable about center C relative to intermediate hub 86, outer hub 40, and sleeve 50;
2. Intermediate hub 86 is pivotable about center C relative to inner hub 30, outer hub 40, and sleeve 50;
3. Outer hub 40 is pivotable about center C relative to inner hub 30, intermediate hub 86, and sleeve 50;
4. All hubs 30, 86, and 40 are pivotable about point C relative to one another and to sleeve 50;
5. All hubs 30, 86 and 40 can move simultaneously relative to sleeve 50;
6. All hubs 30, 86, and 40 have no relative axial movement;
7. Outer hub 40 is maintained concentric (piloted) with intermediate hub 86 and inner hub 30; and
8. Intermediate hub 86 is maintained concentric (piloted) with outer hub 40 and inner hub 30.

FIG. 14 diagrammatically illustrates hubs 30, 86, and 40 of FIG. 13 pivoted about point C relative to one another and relative to sleeve 50. Outer hub 40 is angularly deflected or pivoted through an angle designated alpha ($\alpha$), intermediate hub 86 is angularly deflected or pivoted through an angle designated beta ($\beta$), and inner hub 30 is angularly deflected or pivoted through an angle designated gamma ($\gamma$). However, since all angular deflection or misalignment occurs about point C, the undesirable unbalanced moments are substantially limited since hubs 30, 86, and 40 rotate about point C.

The primary advantage of having a three hub coupling rather than a two hub coupling is the angle of deflection for each individual hub member relative to each other need not be as great as in a two hub coupling in order to maintain the same amount of angular misalignment of the shaft. By decreasing the amount of pivoting of each individual hub member with respect to each other, the gear teeth of each hub will maintain greater surface contact with the gear teeth of the hub that it is engaged with thereby insuring less gear teeth wear and consequently greater gear life.

The foregoing has described a coupling which is a substantial improvement over heretofore known gear type couplings. Advantageously, the coupling of the present invention reduces angular deflection between each set of gear teeth while maintaining a common pivot or hinge point for the inner and outer hubs thereby avoiding the whipping effect caused by unbalanced moments associated with coupling components. Furthermore, the present invention provides a coupling concept which is useful for various applications, and, in addition, may be disassembled and reassembled without difficulty which might otherwise be necessary by use of elaborate and numerous coupling components.

Having thus described the invention in its best embodiment and mode of operation, that which is desired to be claimed by Letters Patent is:

1. A gear type coupling comprising:
   a sleeve member substantially defining an axial bore and having radially inwardly extending gear teeth;
   an outer hub member positioned within said sleeve member and having an annular body portion with radially outwardly extending gear teeth and radially inwardly extending gear teeth;
   said outer hub member outwardly extending gear teeth having arcuate circumferential faces the radii of which passes through a common point along the axis of said coupling;
   said outer hub member outwardly extending gear teeth engageable with said sleeve member inwardly extending gear teeth to provide a non-rotatable connection therewith;
   said outer hub member angularly pivotable about said common point and relative to said sleeve to compensate for angular misalignment therebetween;
   an inner hub member within said outer hub member having outwardly extending gear teeth engageable with said outer hub member inwardly extending gear teeth to provide a non-rotatable connection therewith;
   said inner hub member angularly pivotable about said common point and relative to said outer hub member and relative to said sleeve to compensate for angular misalignment therebetween;
   pilot means between said inner and outer hub members comprising bearing surfaces on said outer hub member engageable with bearing surfaces on said inner hub member for maintaining said inner and outer hub members pivotable about said common point; and
   said bearing surface on said inner hub member being spherically convex having a radius which passes through said common point for maintaining said inner and outer hub members pivotably operable about said common point thereby maintaining radial concentricity between said inner and outer hub members.

2. The gear type coupling as set forth in claim 1 wherein said pilot means restricts relative axial movement between said inner and outer hub members.

3. The gear type coupling as set forth in claim 2 wherein said inner and outer hub members are simultaneously axially movable relative to said sleeve member.

4. The coupling of claim 1 wherein said bearing surfaces on said outer hub member comprise:
   concave spherical bearing surfaces in mating engagement with said convex bearing surfaces on said inner hub member,
   the radii of said concave spherical bearing surface passing through said common point along the axis of said coupling,
   for maintaining radial concentricity between said inner and outer hub members.

5. The gear type coupling as set forth in claim 4 wherein said bearing surfaces comprise:
   axially opposed inner hub bearing surfaces secured adjacent the sides of said inner hub outwardly extending gear teeth,
   said inner hub bearing surfaces comprising corresponding segments of a sphere thereby providing annular spherical bearing surfaces; and
   axially opposed outer hub bearing surfaces secured adjacent the sides of said outer hub inwardly extending gear teeth and engageable with said annular bearing surfaces of said inner hub member.

6. The coupling of claim 1 wherein said bearing surface on said outer hub member comprises:
   conical bearing surfaces in engagement with said convex bearing surfaces on said inner hub member;
   said conical bearing surfaces defined by a line struck normal to each of said conical surfaces passing through said common point,
   whereby radial concentricity may be maintained between said inner and outer members.

7. The gear type coupling as set forth in claim 6 wherein said bearing surfaces comprise:
   axially opposed inner hub bearing surfaces secured to adjacent sides of said inner hub outwardly extending gear teeth;
   said inner hub bearing surfaces comprising corresponding segments of a sphere thereby providing annular spherical bearing surfaces; and
   axially opposed outer hub bearing surfaces secured adjacent the sides of said outer hub inwardly extending gear teeth and engageable with said annular bearing surfaces of said inner hub member.

8. A gear type coupling as set forth in claim 1 in which,
   a spindle shaft is non-rotatably connected to said inner hub member and extends axially therefrom,
   said inner hub member and a portion of said spindle shaft extend into the axial bore of said sleeve member;
   first and second abutting annular rings are secured to said sleeve member for defining a radially inwardly extending annular groove between said rings; and
   a third annular flexible metallic ring means engages said spindle shaft and includes a rigid annular portion extending radially outwardly therefrom and into said annular groove for flexibly sealing said sleeve member around said spindle shaft.

9. The gear type coupling as set forth in claim 1 in which,
   said inner hub member outwardly extending gear teeth have axially arcuate circumferential faces the radii of which passes through said common point.

10. The gear type coupling as set forth in claim 1 which further includes,
    a radially outwardly extending annular shoulder portion on at least one end of said outer hub member for abutting said sleeve member to limit angular pivoting of said outer hub member relative to said sleeve member.

11. The gear type coupling as setforth in claim 1 which further includes,
    stop means to limit angular pivoting between said inner and outer hub members.

12. A gear type coupling comprising:
    a sleeve member substantially defining an axial bore and having radially inwardly extending gear teeth;
    an outer hub member positioned within said sleeve member and having an annular body portion with radially outwardly extending gear teeth an radially inwardly extending gear teeth;

said outer hub member outwardly extending gear teeth having arcuate circumferential faces the radii of which passes through a common point along the axis of said coupling;

said outer hub member outwardly extending gear teeth engageable with said sleeve member inwardly extending gear teeth to provide a non-rotatable connection therewith;

said outer hub member angularly pivotable about said common point and relative to said sleeve to compensate for angular misalignment therebetween;

an inner hub member having outwardly extending gear teeth, at least one intermediate hub member having outwardly and inwardly extending gear teeth, said intermediate hub member outwardly extending gear teeth engageable with said outer hub member inwardly extending gear teeth to provide a non-rotatable connection therewith, said intermediate hub member inwardly extending gear teeth engageable with said inner hub member outwardly extending gear teeth to provide a non-rotatable connection therewith, said intermediate hub member angularly pivotable about said common point and relative to said outer hub member and relative to said sleeve to compensate for angular misalignment therebetween, said inner hub member angularly pivotable about said common point and relative to said sleeve and relative to said outer hub member and relative to said intermediate hub member to compensate for angular misalignment therebetween;

pilot means between said inner and intermediate hub members and between said intermediate and said outer hub members comprising bearing surfaces on said outer hub member engageable with bearing surfaces on said intermediate hub member and bearing surfaces on said intermediate hub member engageable with bearing surfaces on said inner hub member for maintaining said inner, intermediate, and outer hub members pivotable about said common point; and said bearing surface on said inner hub member and said bearing surface on said intermediate hub member which is engageable with said outer hub members bearing surface each being spherically convex and each having a radius which passes through said common point for maintaining said inner, intermediate, and outer hub members pivotably operable about said common point thereby maintaining radial concentricity between said inner, intermediate, and outer hub members.

* * * * *